Patented Oct. 3, 1950

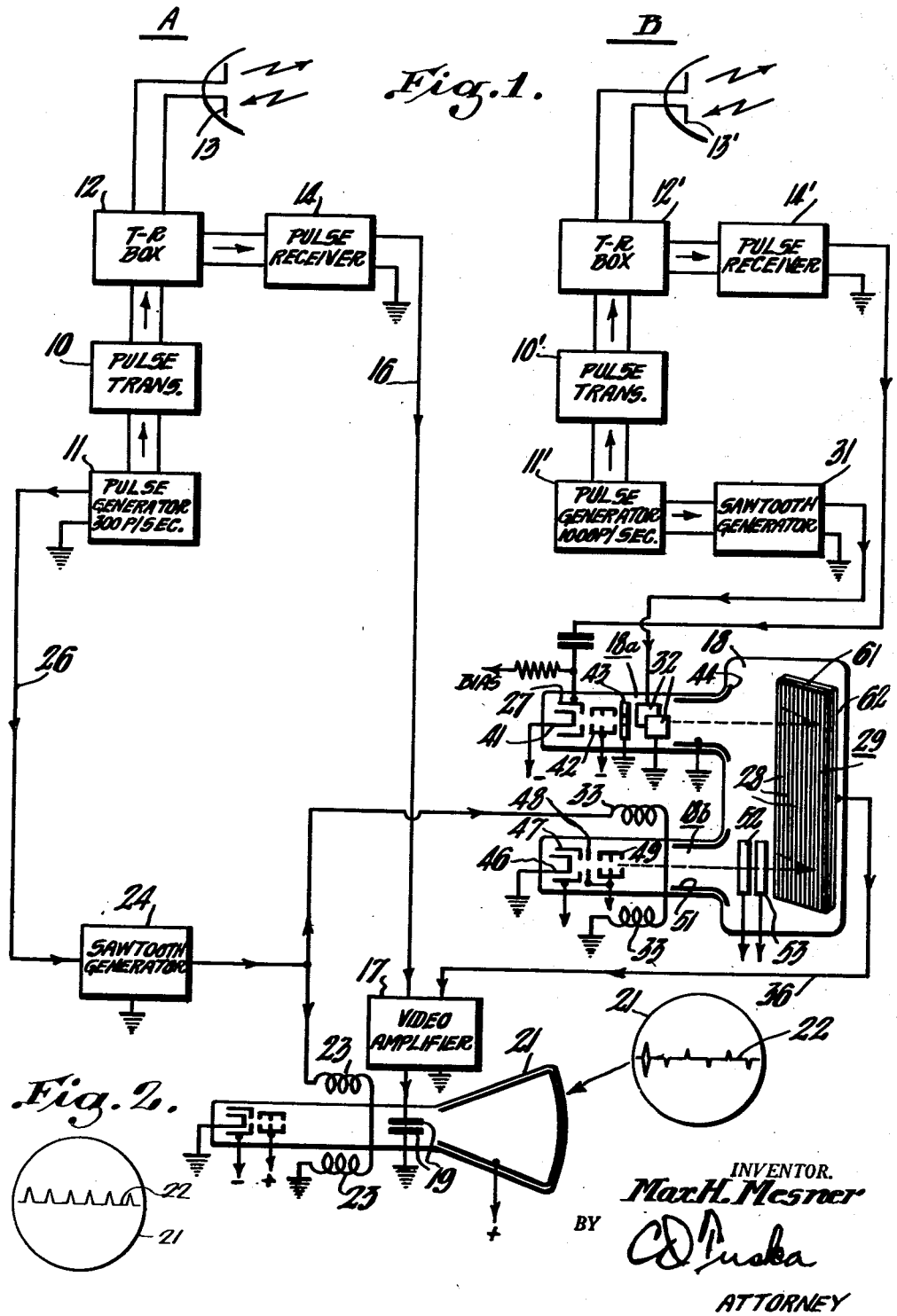

2,524,296

UNITED STATES PATENT OFFICE 2,524,296

PULSE-ECHO RADIO LOCATOR SYSTEM

Max H. Mesner, Princeton, N. J., assignor to Radio Corporation of America, a corporation of Delaware Application September 24, 1945, Serial No. 618,342

9 Claims. (Cl. 343—13)

1

My invention relates to radar systems and particularly to systems wherein it is desirable to observe indications from a plurality of radar stations.

It is often desirable to employ two or more radar stations having different characteristics for obtaining aircraft warnings or the like. For example, it may be desirable to have an area scanned simultaneously by a broad radio beam and by a narrow radio beam, the two beams being radiated from radar transmitters that are not being pulsed in synchronism. It is desirable that the indications from the two radar stations be made to appear on a single cathode ray tube indicator for ease of observation. As another example, it may be desirable that two or more radar stations be operated at widely differing pulse rates, the station with the lowest pulse rate being designed for maximum pulse output and for maximum range.

An object of the invention is to provide a method of and means for producing on a single indicator the indications obtained from a plurality of radar stations that are not pulsed in synchronism.

A further object of the invention is to provide an improved radar system.

A still further object of the invention is to provide an improved method of and means for changing the frequency of complex waves.

According to a preferred embodiment of the invention the signal from the receiver of one radar station is supplied to a cathode ray storage tube where it is "put on" or stored on a storage screen. The deflection of the "put-on" cathode ray is synchronous with the pulse modulation of the radar station transmitter.

The stored radar indications are taken off the storage screen by a cathode ray that is deflected in synchronism with the pulse modulation of a second radar station transmitter and the signal thus taken off is supplied to a deflecting electrode or to deflecting plates of a cathode ray indicator tube. The cathode ray of the indicator tube is deflected along a time axis in synchronism with the pulse modulation of the second radar station transmitter.

The radar indications from the receiver of the second radar station are combined with those taken off the storage tube and applied with them to the deflecting electrode or deflecting plates. Thus, the indications from both radar stations appear on a single indicator tube.

The invention will be better understood from the following description taken in connection

2 with the accompanying drawing in which the Figure 1 is a block and circuit diagram of one embodiment of the invention and Figure 2 is a view illustrating the indication for another embodiment of the invention.

Referring to the drawing, there is shown a radar system comprising a radar station A and a radar station B, each of the pulse-echo type. The radar station A comprises a radio transmitter 10 which is pulse modulated by electrical pulses supplied from a pulse generator 11. The radio pulses from transmitter 10 are supplied through an antenna duplexer unit, such as the T-R box 12, to a directive antenna 13. Reflected pulses are picked up by the antenna 13 and supplied through the T-R box 12 to a radio pulse receiver 14 where they are amplified and demodulated. The resulting video-frequency pulses are supplied over a conductor 16 to a video-frequency amplifier. The T-R box may be of the type described in application Serial No. 483,959, filed April 21, 1943, in the name of Thomas L. Gottier and entitled Antenna Duplexing.

As will be described hereinafter, the reflected signals received at the radar station B are also supplied to the amplier 17 through a storage tube 18 whereby the signals picked up by both radar stations appear in the output circuit of the amplifier 17. These signals are applied to the vertical deflecting plates 19 of a cathode ray indicator tube 21 so that they produce "pips" on a cathode ray trace 22.

The cathode ray trace 22 results from the horizontal deflection of the cathode ray of the tube indicator 21 along a time axis. This deflection is produced by a pair of deflecting coils 23 which are supplied with sawtooth current from a sawtooth wave generator 24. The sawtooth generator 24 is synchronized with the pulse generator 11 by means of pulses supplied over a conductor 26 whereby the trace 22 starts at the instant a radio pulse is transmitted.

Referring now to the radar station B, this station differs from the radar station A only in features such as the width of the radio beam, the repetition rate of the modulating pulses, or the like. The various circuit elements that are similar to those in the radar station A are indicated by similar reference characters with a prime mark added.

The reflected pulses picked up by the station B are supplied, after demodulation in the receiver 14', to a control electrode 27 in the "put-on" section 18a of the storage tube 18. The electron beam of the "put-on" section is deflected transversely across the storage element strips 28 of a storage screen 29 in synchronism with the modulating pulses produced by the pulse generator 11'. This deflection of the "put-on" beam is produced by sawtooth voltage waves which are supplied from a sawtooth generator 31 to a pair of deflecting plates 32.

The particular storage tube that is illustrated is the same as that described in application Serial No. 492,658, now Patent No. 2,454,652, issued November 23, 1948, filed June 26, 1943, in the names of Harley Iams, Albert Rose and Gardiner L. Krieger and entitled Cathode Ray Storage Tube.

The reflected pulses which have been stored on the storage element strips 28 by the put-on beam are taken off the storage screen 29 by the take-off cathode ray or beam which is produced in a take-off section 18b. The take-off beam is deflected transversely across the storage strips 28 by means of a pair of deflecting coils 33 which are supplied with sawtooth current from the sawtooth generator 24. This deflection of the take-off beam is in synchronism with the deflection of the cathode ray of the indicator tube 21.

The signal pulses taken off the storage screen 29 by the take-off beam are supplied over a conductor 36 and through the amplifier 17 to the deflecting plates 19 of the indicator tube.

Since the reflected pulses picked up by the station B are taken off the storage screen 29 in synchronism with the pulse transmission from the station A, the reflected pulses picked up by the two stations will be indicated by pips which are correctly located on the time axis 22 of the indicator tube 21. The time axis 22 preferably is calibrated in suitable distance units.

If desired, the pips produced by the signals from the stations A and B may be made to appear above and below the time or distance axis 22, respectively, as illustrated by supplying said signals with opposite polarities to the deflecting plates 19. As indicated in Fig. 2, however, it may be preferred to have all the pips appear on the same side of the time axis. In this case of course, the signals from stations A and B are supplied with like polarities to the deflecting plates 19.

The construction of the storage tube 18 will now be described generally, no detailed description being necessary as the present invention does not cover the storage tube per se.

The put-on section 18a includes a cathode 41, the control electrode 27, a first anode 42, a second anode 43, and a collector electrode 44. Suitable voltages are applied to produce a high velocity put-on beam.

The take-off section 18b includes a cathode 46, a control electrode 47 held at a fixed bias potential, a screen grid 48, a first anode 49, and a second anode 51. Two ring or frame-like electrodes 52 and 53 are positioned between the second anode 51 and the screen 29 for slowing down the electrons of the beam after they leave the region of the second anode. Thus a low velocity take-off beam is obtained at the screen 29.

The storage screen 29 may comprise a supporting sheet of mica 61 which has the conducting strips 28 on the beam side and a metal coating 62 on the opposite side. In the example shown, the coating 62 is used as a signal plate for taking off the stored signals.

It should be understood that the invention is not limited to the specific type of storage tube illustrated. Also, it will be apparent that the invention may be applied to a radar system comprising more than two radar stations.

Although it has been indicated on the drawing that the station B is operated at a higher pulse rate than the station A, the reverse may be true in some systems, in which case the storage tube arrangement functions to multiply the frequency of the radar signals picked up by the station B. Since the take-off beam now is deflected several times while the put-on beam is being deflected once, the take-off beam intensity is adjusted so that only part of the stored signal is taken off the storage screen, by one sweep of the take-off beam. Thus, there is always some stored signal on the screen to be removed by the take-off beam.

The signal multiplying arrangement may be especially useful where the repetition rate of the put-on signal is less than that of persistence of vision and where the signal is to appear on a phosphorescent screen that does not have long enough persistence to produce a non-flickering image if said signal is applied directly to said screen. By multiplying the low repetition rate signal in the manner described, a steady image may be made to appear on a cathode-ray tube phosphorescent screen of the type having short persistence.

I claim as my invention:

1. A system comprising a plurality of radio locator stations of the pulse-echo type, each station comprising a radio transmitter and a radio receiver, each station including means for pulse modulating the transmitter, a cathode ray indicator tube, means for deflecting the cathode ray of said indicator tube along a time axis in synchronism with the pulse modulation of one of said stations, a cathode ray control element for causing said cathode ray to produce an indication on said time axis in response to the application of a signal to said control element, means for supplying the receiver signal output of said one station to said cathode ray control element, a cathode ray storage tube having a storage screen and having means for producing at least one cathode ray, means for deflecting said put-on ray across said storage screen in synchronism with the pulse modulation of another of said stations, means for modulating said put-on ray by the receiver output of said other station whereby reflected pulses picked up by said other station are stored on said screen, means for taking said pulses off said storage screen at a periodic rate in synchronism with the pulse modulation of said one station, and means for supplying the pulses taken off said screen to said control element of said indicator tube.

2. A system comprising a plurality of radio locator stations of the pulse-echo type, each station comprising a radio transmitter and a radio receiver, each station including means for pulse modulating the transmitter, a cathode ray indicator tube, means for deflecting the cathode ray of said indicator tube along a time axis in synchronism with the pulse modulation of one of said stations, a cathode ray control element for causing said cathode ray to produce an indication on said time axis in response to the application of a signal to said control element, means for supplying the receiver signal output of said one station to said cathode ray control element, a cathode ray storage tube having a storage screen and having a put-on section which includes means for producing a put-on cathode ray, said storage tube also having a take-off section which includes means for producing a take-off cathode ray, means for deflecting said put-on ray across said storage screen in synchronism with the pulse modulation of another of said stations, means for modulating said put-on ray by the receiver output of said other station whereby reflected pulses picked up by said other station are stored on said screen, means for deflecting said take-off ray across said storage screen in synchronism with the pulse modulation of said one station whereby said stored pulses are taken off said screen, and means for supplying the pulses taken off said screen to said cathode ray control element of said indicator tube.

3. A system comprising a plurality of radio locator stations of the pulse-echo type, each station comprising a radio transmitter and a radio receiver, each station including means for pulse modulating the transmitter, a cathode ray indicator tube, means for deflecting the cathode ray of said indicator tube along a time axis in synchronism with the pulse modulation of one of said stations, the rate of pulse modulation of said one station being comparatively low, a cathode ray control element for causing said cathode ray to produce an indication on said time axis in response to the application of a signal to said control element, means for supplying the receiver signal output of said one station to said cathode ray control element, a cathode ray storage tube having a storage screen and having a put-on section which includes means for producing a put-on cathode ray, said storage tube also having a take-off section which includes means for producing a take-off cathode ray, means for deflecting said put-on ray across said storage screen in synchronism with the pulse modulation of another of said stations, the pulse modulation of said other station being at a comparatively high rate, means for modulating said put-on ray by the receiver output of said other station whereby reflected pulses picked up by said other station are stored on said screen, means for deflecting said take-off ray across said storage screen in synchronism with the pulse modulation of said one station whereby said stored pulses are taken off said screen, and means for supplying the pulses taken off said screen to said cathode ray control element of said indicator tube.

4. A system comprising a radio locator station of the pulse-echo type, said station comprising a radio transmitter and a radio receiver and including means for pulse modulating the transmitter at a comparatively low periodic rate, a cathode ray indicator tube, said indicator tube including a phosphorescent screen having a comparatively short persistence, means for deflecting the cathode ray of said indicator tube along a time axis at a comparatively high periodic rate, said indicator tube including a cathode ray control element for causing said cathode ray to produce an indication on said time axis in response to the application of a signal to said element, a cathode ray storage tube having a storage screen and having means for producing a cathode ray, means for deflecting said cathode ray across said storage screen in synchronism with the pulse modulation of said station, means for modulating said cathode ray by the receiver signal output of said station whereby reflected pulses picked up by said station are stored on said screen, means for taking said pulses off said screen repeatedly at said comparatively high periodic rate and in synchronism with the cathode ray deflection of said indicator tube, and means for supplying the pulses taken off said screen to said ray control element of said indicator tube.

5. A system comprising a radio locator station of the pulse-echo type, said station comprising a radio transmitter and a radio receiver and including means for pulse modulating the transmitter at a comparatively low periodic rate, a cathode ray indicator tube, said indicator tube including a phosphorescent screen having a comparatively short persistence, means for deflecting the cathode ray of said indicator tube along a time axis at a comparatively high periodic rate, said indicator tube including a cathode ray control element for causing said cathode ray to produce an indication on said time axis in response to the application of a signal to said element, a cathode ray storage tube having a storage screen and having a put-on section which includes means for producing a put-on cathode ray, said storage tube also having a take-off section which includes means for producing a take-off cathode ray, means for deflecting said put-on ray across said storage screen in synchronism with the pulse modulation of said station, means for modulating said put-on ray by the receiver signal output of said station whereby reflected pulses picked up by said station are stored on said screen, means for deflecting said take-off ray in synchronism with the cathode ray deflection of said indicator tube whereby said stored pulses are repeatedly taken off said screen at said comparatively high periodic rate, and means for supplying the pulses taken off said screen to said cathode ray control element of said indicator tube.

6. In a system wherein signals occuring at a comparatively low periodic rate are to be viewed on a phosphorescent screen, a cathode ray indicator tube which includes a phosphorescent screen having comparatively short persistence, means for producing a cathode ray in said tube and directing it against said screen, means for deflecting the cathode ray of said indicator tube along a time axis at a comparatively high periodic rate, said indicator tube including a cathode ray control element for acting upon said cathode ray in response to the application of a signal to said element, a cathode ray storage tube having a storage screen and having a put-on section which includes means for producing a put-on cathode ray, said storage tube also having a take-off section which includes means for producing a take-off cathode ray, means for deflecting said put-on ray across said storage screen at said low periodic rate, means for modulating said put-on ray by said signals whereby they are stored on said storage screen, means for deflecting said take-off ray in synchronism with the cathode ray deflection of said indicator tube whereby said stored pulses are repeatedly taken off said screen at said comparatively high periodic rate, and means for supplying the pulses taken off said storage screen to said cathode ray control element of said indicator tube.

7. The invention according to claim 6 wherein said comparatively low periodic rate is less than that of persistence of vision.

8. A system comprising a radio locator station, said station comprising radio transmitter and receiver means for cyclically providing information as to the positions of objects within the service area of said locator station at a relatively low repetition rate, a cathode ray storage tube having a storage screen, means for storing said information obtained by said locator station in the form of point charges on said screen, said screen having a storage characteristic such that it stores said information for a comparatively long period, a cathode ray indicator tube, said indicator tube including a fluorescent screen having a comparatively short persistence, said persistence being so short that the screen would flicker if scanned at said relatively low repetition rate, means for scanning said storage screen by a cathode ray of the storage tube at a repetition rate that is high compared with said relatively low repetition rate to take signal off the storage screen, means for scanning said short persistence screen by the cathode ray of the indicator tube in synchronism with said scanning of said storage screen, and means for supplying the signal taken off said storage screen to the indicator tube for causing the cathode ray to produce an indication whereby said information is reproduced on the indicator tube screen.

9. A system comprising a radio locator station of the pulse-echo type, said station comprising a radio transmitter and a radio receiver and including means for pulse modulating the transmitter at a comparatively low periodic rate, a cathode ray indicator tube, said indicator tube including a fluorescent screen having a comparatively short persistence, said persistence being so short that the screen would flicker if scanned at said relatively low periodic rate, means for deflecting the cathode ray of said indicator tube along a time axis at a periodic rate that is high compared with said relatively low periodic rate, said indicator tube including a cathode ray control element for causing said cathode ray to produce an indication on said time axis in response to the application of a signal to said element, means including a cathode ray storage tube having a storage screen for storing reflected pulses picked up by said station on said screen as a picture of the objects reflecting said pulses, means for taking said stored pulses off said screen repeatedly at said comparatively high periodic rate and in synchronism with the cathode ray deflection of said indicator tube, and means for supplying the pulses taken off said scren to said cathode ray control element of said indicator tube.

MAX H. MESNER.

REFERENCES CITED

The following references are of record in the file of this patent:

UNITED STATES PATENTS

| Number | Name | Date |
|---|---|---|
| 2,403,562 | Smith | July 9, 1946 |
| 2,412,669 | Bedford | Dec. 17, 1946 |
| 2,430,038 | Wertz | Nov. 4, 1947 |
| 2,433,341 | Busignies | Dec. 30, 1947 |
| 2,437,173 | Rutherford | Mar. 2, 1948 |